(12) United States Patent
Buskens et al.

(10) Patent No.: US 6,192,250 B1
(45) Date of Patent: Feb. 20, 2001

(54) CLUSTER MOBILE SWITCHING CENTER

(75) Inventors: Richard Wayne Buskens, Middletown, NJ (US); Michael P. Deitz, Naperville, IL (US); Thomas F. La Porta, Thornwood, NY (US); Yow-Jian Lin, Edison, NJ (US); Kazutaka Murakami, Freehold, NJ (US); Ramachandran Ramjee, Matawan, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/145,094

(22) Filed: Sep. 1, 1998

Related U.S. Application Data

(60) Provisional application No. 60/067,398, filed on Dec. 5, 1997.

(51) Int. Cl.[7] .................................................. H04M 1/00
(52) U.S. Cl. .......................... 455/463; 455/433; 455/463
(58) Field of Search .................................. 455/460, 560, 455/507, 422, 445, 432, 433, 403, 561, 463; 709/229, 303, 300, 323

(56) References Cited

U.S. PATENT DOCUMENTS

H1837 * 2/2000 Fletcher et al. ....................... 455/433

OTHER PUBLICATIONS

*IEEE Personal Communications Magazine*, Special Issue on IMT–2000: Standards Efforts of the ITU, 4, No. 4 (Aug. 1997).

T. F. La Porta et al., "Distributed Call Processing for Personal Communications Services," *IEEE Communications Magazine*, 33, No. 6 (Jun. 1995).

T. F. La Porta et al., "Comparison of Signaling Loads forf PCS Systems," *IEEE/ACM Transactions on Networking*, 4, No. 6 (Dec. 1996).

"The Common Request Broker: Architecture and Specification," Rev. 1.2 (Dec. 1993) can be ordered from Global Engineering Documents, 15 Inverness Way East, Englewood, Colorado 801124–5704.

K. Murakami et al., "Design, Implementation, and Evaluation of Highly Available Distributed Call Processing Systems," FTCS'98.

(List continued on next page.)

*Primary Examiner*—Curtis A. Kuntz
*Assistant Examiner*—Melur Ramakrishnaiah
(74) *Attorney, Agent, or Firm*—Barry H. Freedman

(57) ABSTRACT

A "cluster mobile switching center" (cMSC) is arranged to perform the switching and control functions of a conventional mobile switching center (MSC), including, if desired, the additional functions of a conventional visitor location register (VLR). The cMSC is implemented on distributed processors using modular software. Advantageously, a specific instance of middleware, known as Common Object Request Broker Architecture (CORBA), is used as the communications middleware. Functionally, the cMSC is arranged to have two classes of servers: (1) Interworking managers (IMs) that act as gateways and provide interfaces to external network elements, and (2) core servers that perform call processing (registration, location updates, incoming and outgoing call processing) functions and communicate with each other using CORBA. IMs terminate standard protocols with the external elements and use CORBA to communicate with the core servers. Software objects are defined to perform specific tasks, manage particular resources, and interact to provide end-to-end services.

8 Claims, 4 Drawing Sheets

OTHER PUBLICATIONS

IS–634 revision A, $2^{nd}$ Ballot Version (Oct., 1997) can be ordered from Global Engineering Documents, 15 Inverness Way East, Englewood, Colorado 80112–5704.

ITU Recommendations Q.700–Q.795, Specifications of Signaling System No. 7, (1997) can be ordered from Global Engineering Documents, 15 Inverness Way East, Englewood, Colorado 80112–5704.

TIA/EIA IS–41 (Revision D): "Cellular Radio–Telecommunications Intersystem Operations" (1997) can be ordered from Global Engineering Documents, 15 Inverness Way East, Englewood, Colorado 80112–5704.

* cited by examiner

10

CLUSTER MOBILE SWITCHING CENTER

CROSS-REFERENCE TO RELATED APPLICATION

This application claims priority of Provisional Application Serial No. 60/067,398 which was filed Dec. 5, 1997.

FIELD OF THE INVENTION

This invention relates generally to cellular wireless telecommunications, and, more particularly, to a switching system for use in a cellular wireless telecommunications network.

BACKGROUND OF THE INVENTION

Cellular telephony is one of the fastest growing communication services. It is also one of the most rapidly evolving areas in terms of technology, services, standards, and service providers. At this time, many options are being considered for the next generation (generally called "third generation") of wireless communication systems, including extensions and additions to existing cellular systems, wireless ATM, and wireless Internet. It is a challenge to build wireless network infrastructure (particularly a switching system) that can meet the needs of yet to be built systems in a cost- and performance-effective way because of the uncertainty as to which technologies will be widely accepted and because it is likely that several sets of standards and technologies will co-exist. For a good description of third generation cellular systems, see IEEE Personal Communications Magazine, Special Issue on IMT2000: Standards Efforts of the ITU, Vol. 4, No. 4, August, 1997.

Third generation systems will require increased capacity because the number of users and bandwidth required for advanced services will greatly increase. For this reason, these systems will use digital air interfaces, and will use smaller cell sizes to increase frequency re-use. The increase in number of network access points (cell sites) requires that more equipment be deployed to concentrate onto a backbone network. This equipment must be inexpensive to allow networks with large coverage areas to be built. To be cost effective, systems should be scalable so that a range of installations, from small and inexpensive to large and high capacity, can be supported.

Third generation networks will also provide an expansive set of services, including telephone services available on modern ISDNs, location-based services, data services, and multimedia communication. Signaling protocols and control procedures must be added to existing systems to support these new services while interworking with existing services. An ideal system will allow new services to be added to existing systems without requiring major software modifications.

Because it is unlikely that there will be a single protocol suite or network type for third generation systems, these systems will have to interwork. In addition, third generation systems will be required to interwork with second generation systems. An ideal system will define a set of functions that cannot only interwork with different networks, but be used to implement different systems without major software redevelopment.

Summarizing, the next generation of wireless infrastructure requires a switching arrangement that is scalable to support inexpensive small installations, and flexible to support the easy introduction of new services and interwork with emerging systems without major software modifications.

One approach to a third generation cellular wireless telecommunications switching system that has been tried in the past is called Wireless Distributed Call Processing Architecture (W-DCPA). This approach is described in a first article authored by La Porta, T. F. Veeraraghavan, M., P. Treventi, R. Ramjee, entitled "Distributed Call Processing for Personal Communications Services," published in IEEE Communications Magazine, Vol. 33, No. 6, June, 1995, and in a second article authored by T. F. La Porta, M. Veeraraghavan, R. W. Buskens, entitled "Comparison of Signaling Loads for PCS Systems," published in IEEE/ACM Transactions on Networking, Vol. 4, No. 6, December 1996.

The W-DCPA approach has several drawbacks. First, it does not allow for graceful evolution from existing systems to a third generation approach, but rather requires a "flash cut" from existing to new equipment. Second, components internal to W-DCPA had various interfaces to other entities in the telecommunications network, which were non-standard. Therefore, W-DCPA was not arranged or able to use existing call processing and mobility management application layer protocols.

SUMMARY OF THE INVENTION

In accordance with the present invention, a "cluster mobile switching center" (cMSC) is arranged to perform the switching and control functions of a conventional mobile switching center (MSC), including, if desired, the additional functions of a conventional visitor location register (VLR). The cMSC of the present invention is implemented on distributed processors using modular software. Advantageously, a specific class of software, known as Common Object Request Broker Architecture (CORBA), is used as the communications middleware. CORBA is described in a publication from the Object Management Group (OMG), The Common Request Broker: Architecture and Specification, Rev. 1.2, December, 1993.

Functionally, the cMSC is arranged to have two classes of servers: (1) Interworking managers (IMs) that act as gateways and provide interfaces to external network elements, and (2) core servers that perform call processing functions and communicate with each other using CORBA. IMs terminate standard protocols with the external elements and use CORBA to communicate with the core servers. Software objects are defined to perform specific tasks and manage particular resources. These objects interact to provide end-to-end services. Each object has a well-defined interface through which others may access its services. As long as its interface is kept unchanged, a single object may be modified to change its behavior or upgrade its functionality without affecting other existing objects. This makes the system scalable in the functional dimension and aids in the evolution from second to third generation systems. Objects that perform strongly related functions are grouped together into a server. The objects within each server are implemented as C++ objects; servers are implemented as CORBA objects, each with its own interface defined in the CORBA Interface Definition Language (IDL). This is the only interface to the server; interfaces to the individual internal objects of a server are not accessible to objects outside the server. Servers each run as a single UNIX process. The servers may be replicated and distributed across processors to allow the system to be scalable in the capacity dimension.

BRIEF DESCRIPTION OF THE DRAWINGS

The present invention will be better understood from the detailed description of its preferred embodiments which follows below, when taken in conjunction with the accompanying drawings, in which like numerals refer to like features throughout. This brief identification of the drawing figures will aid in understanding the detailed description that follows.

DETAILED DESCRIPTION

Figure 1:
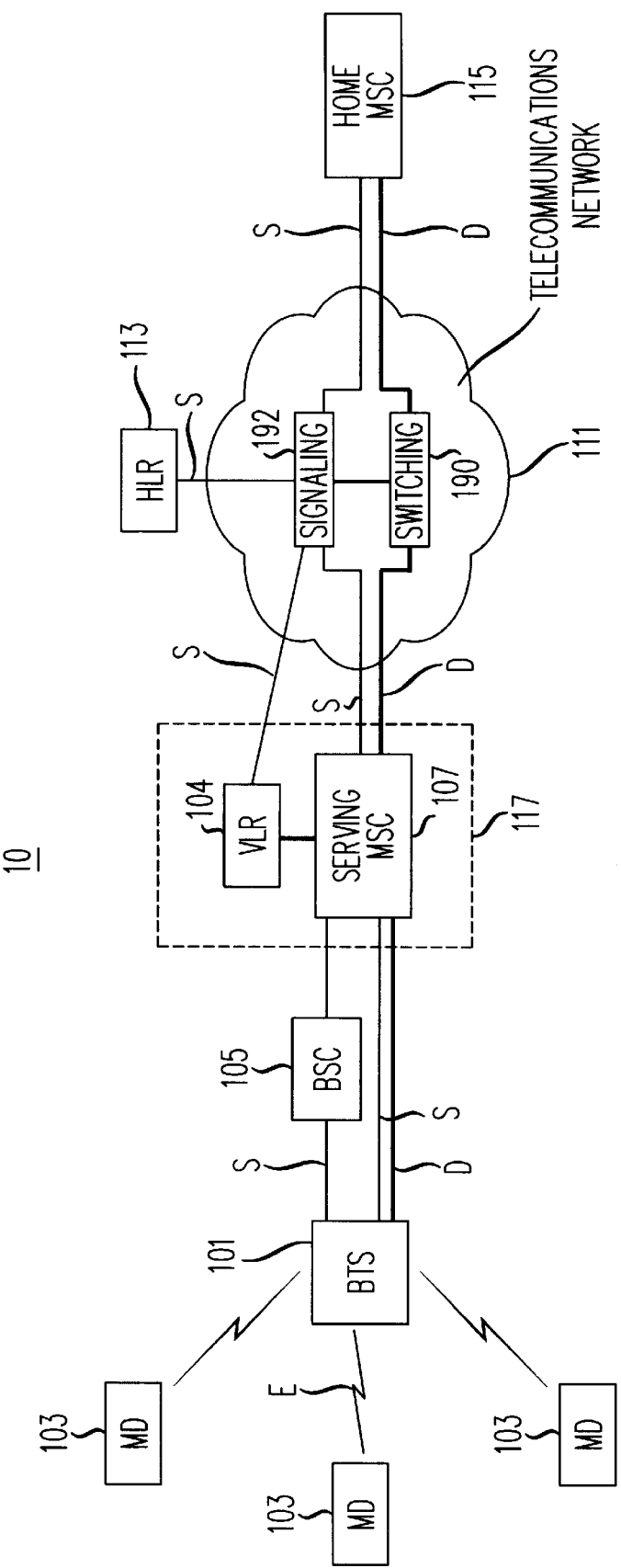
FIG. 1 is a schematic depiction of a cellular telephone network with which the present invention may be used.

FIG. 1 illustrates the overall architecture of a prior art cellular telecommunications network with which the present invention can be used. An advantage of the present invention is that it will also be capable of use with the next generation of cellular telecommunications networks now being designed, as will be apparent as this description proceeds.

The network 10 in FIG. 1 has numerous mobile devices (MD) 103 that communicate in a known fashion via electromagnetic waves E with a nearby base terminal station (BTS) 101. A typical mobile device 103 would be a cellular telephone. The base terminal station 101 converts the electromagnetic waves E from the mobile stations to suitable electrical or optical digital signals according to predetermined protocols and transmits them to a serving mobile switching center (MSC) 107, either directly or via a base station controller (BSC) 105. The information transmitted to MSC 107 typically includes user traffic in the form of data D as well as control traffic in the form of signaling messages S. Base station controller 105 is used in some cellular telecommunications networks, in order to provide the necessary intelligence for multiple base stations, thereby performing power control, managing soft handoffs and controlling paging for locating a particular mobile device.

MSC 107, which performs multiple functions relating to the transport of user information, such as switching, voice coding and frame selection, is designated as a "serving" switch (as opposed to a "home" switch, discussed below) because it is providing communications functionality for mobile devices 103 that are operating in a geographic region different from their "home" region. This is often the case, since mobile devices such as cellular telephones are intended to be used in a mobile environment, and it is more likely than not that a person using such a device is not in the relatively small geographic area that is considered to be his or her home area.

As a "serving" mobile switching center, MSC 107 operates in conjunction with a database arranged to store location and service profile information, known as a "visitor" location register (VLR) 109. VLR 109 may be an integral part of MSC 107, or work in cooperation therewith, and for this reason, VLR 109 and MSC 107 are shown enclosed in a dotted rectangle 117; in either event, VLR 109 performs several functions, including receiving registration messages from mobile devices 103 and registering them with their assigned home location register (HLR) 113 (discussed below), storing temporary copies of service profiles for each registered user and/or mobile device, and querying the serving mobile switching center 107 for a temporary routing number during incoming calls.

MSC 107, and VLR 109, if not an integral part of MSC 107, are both connected to a telecommunications network 111 (which may be the traditional public switched telephone network (PSTN), an ISDN or B-ISDN network, or the Internet) which is depicted as a "cloud" in FIG. 1. Telecommunications network 111 includes interconnected switching elements 190 (such as 5ESS switches manufactured by LUCENT TECHNOLOGIES, INC.), and signaling elements 192 (such as STP's manufactured by LUCENT TECHNOLOGIES, INC.) As is well known to those skilled in the art, the signaling elements carry control messages that allow calls to be extended through the switches in the network toward appropriate destinations. The connection between MSC 107 and telecommunications network 111 carries both user data and signaling information, while only signaling information is passed between VLR 109 and telecommunications network 111. In reality, as will be apparent to persons skilled in the art, each MSC may be connected to a variety of networks, via a variety of connections.

In order to illustrate how a call is originated and completed, FIG. 1 also includes a single "home" mobile switching center (MSC) 115 that is connected to telecommunications network 111. It will be understood that each home MSC such as MSC 115 serves multiple MD's 104 (which again may be cellular telephones), and that there are multiple MSC's not shown in FIG. 1 that are the "home" switches for numerous other mobile devices. Another database, known as a home location register (HLR) 113, stores a permanent service profile for each MD 104 that uses MSC 115 as its home switch. Typically, HLR 113 is separate from MSC 115, although, in some arrangements, they may be part of the same system installation. The connection between MSC 115 and telecommunications network 111 carries both user data and signaling information, while only signaling information is passed between HLR 113 and telecommunications network 111.

The purpose of FIG. 1 is to illustrate the numerous functions performed by MSC 107, MSC 115, VLR 109 and HLR 113 when calls are originated by a mobile device (called "outbound" calls), and when calls are destined for a mobile device (called "inbound" calls). These functions will be briefly described.

For inbound calls, a caller dials the number associated with a particular MD, and because the MD can be in any geographic location, the call is first routed to its home MSC, using the telephone number of the MD. The home MSC determines the HLR of the MD using the telephone number of the MD, so that information stored in HLR indicative of the current location of the MD that was called can be accessed, and the call can therefore be connected to the desired mobile device, by directing the call through the telecommunications network 111 to the appropriate serving MSC.

For outbound calls, a caller dials the number associated with a particular desired destination, and because the MD is by definition in the geographic region served by a particular serving MSC, the call is first routed to that particular MSC. That MSC forwards the call on to the desired destination, typically by extending the call through telecommunications network 111. In completing the call, information stored in the MD's visiting location register, such as billing information, is used.

From the foregoing brief description, it can be seen that an MSC, whether serving as a home MSC or a serving MSC, must perform numerous control and call completion functions. These functions include (a) terminating signaling protocols from the base station controllers 105 and other network elements; (b) routing outgoing connections to the next hop switch in telecommunications network 111; (c) assigning temporary routing numbers for incoming calls; (d) coordinating paging through the base station controllers 105 to locate mobile devices 103, 104 that are receiving incoming calls; (d) routing incoming calls to the appropriate base terminal station 101; (e) coordinating handoffs between the base terminal stations 101 of the network, (f) triggering the logic for any value-added services activated on a call, and (g) allocating transport resources (e.g. resources of a vocoder) within the MSC.

Wireless networks of the future, also known as "third-generation" wireless networks, will likely have additional functional requirements, including supporting such features as (a) multi-connection multimedia calls, (b) multi-party (conference) calls, (c) voice, data and multimedia applications, and (d) enhanced quality of service on packet networks. Third-generation systems will also likely support many different user interface protocols, such as (a) ISDN User Part (ISUP), (b) broadband-ISUP, (c) Mobile Application Part (MAP) and (d) Intelligent Network Application Part (INAP). As will be apparent as this description proceeds, the present invention is capable of supporting all of these functions and operating with all of these different protocols, as well as other functions and protocols as they are developed.

The present invention provides a mobile switching system that not only performs the functions used currently in second-generation systems, but also supports services being planned for third-generation cellular telecommunication networks. The present invention employs a cluster of processors with a unique architecture that enables the use of modularized software and distributed processing to allow both functional and capacity scaling.

Figure 2:
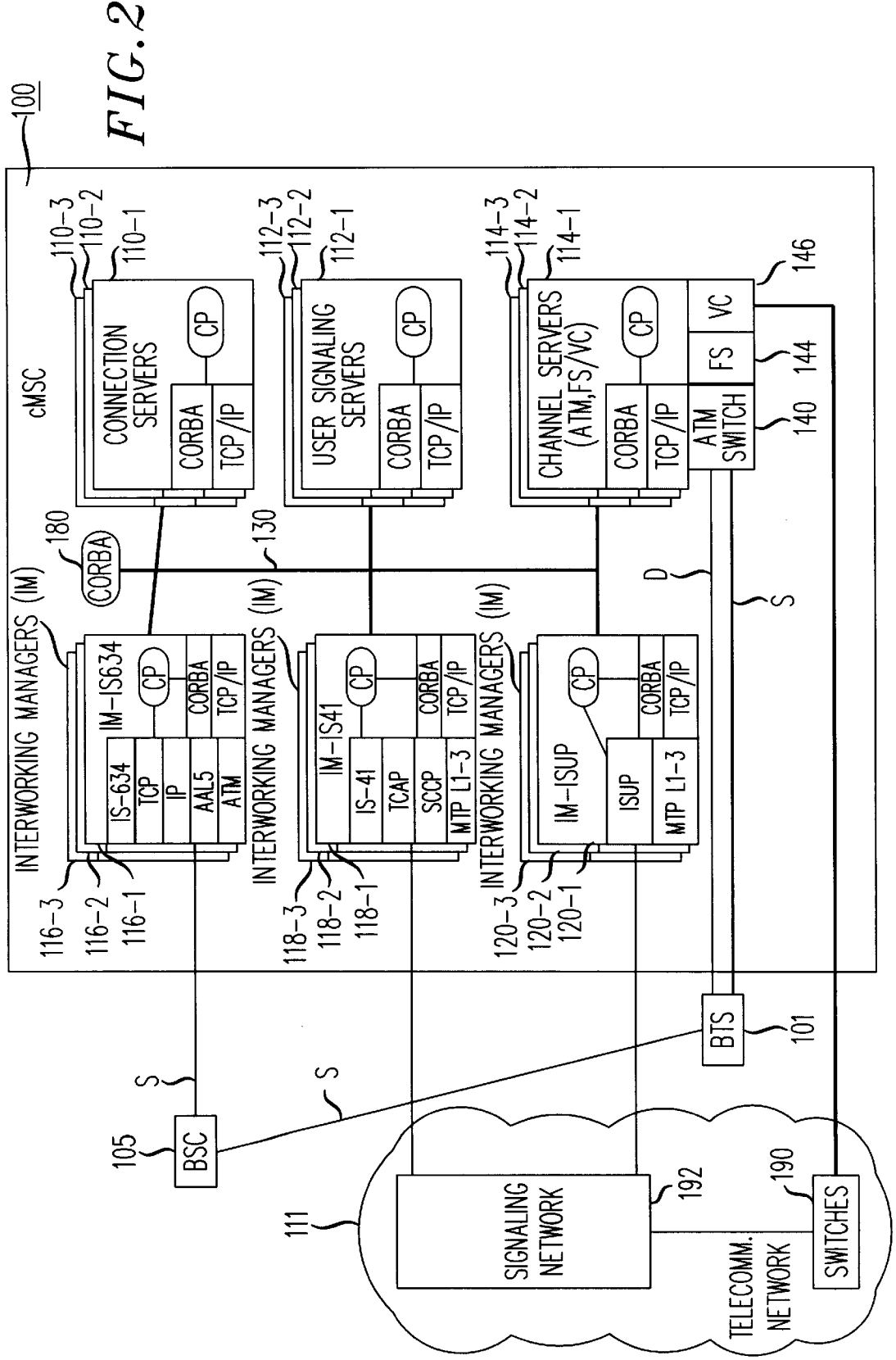
FIG. 2 is a schematic depiction of a cluster mobile switching center (cMSC) in accordance with the present invention.

Turning now to FIG. 2, there is shown the overall architecture and arrangement of a cluster mobile switching center (cMSC) 100 in accordance with an embodiment of the present invention. This description should be read in light of the background information contained in a paper by K. Murakami, R. Buskens, R. Ramjee, Y-J Lin, T. La Porta, entitled "Design, Implementation, and Evaluation of Highly Available Distributed Call Processing Systems," FTCS'98.

The cMSC 100 includes a plurality of core servers that provide specific call processing (CP) functions, and a plurality of interworking managers that provide interfaces between cMSC 100 and external elements in a cellular telecommunications network environment, such as various elements of FIG. 1, including telecommunications network 111, BSC 105 and BTS 101. To external elements, cMSC 100 behaves as a standard integrated MSC and VLR. During registration procedures, cMSC 100 receives registration and location updates from the mobile devices 103 through a BSC 105, registers the mobile device with the HLR 113, and populates the user's service profile. During outgoing calls from a mobile device 103, cMSC 100 receives the service request from the mobile device through BSC 105 and routes the connection to the proper one of the switches 190 in telecommunications network 111. During incoming calls to a mobile device 103, cMSC 100 performs both call/connection control and mobility management functions. During these procedures, it responds to routing requests from HLR 113 by assigning a temporary routing number, paging the mobile device, and routing the connection to the proper base terminal station 101. Finally during all of these procedures, cMSC 100 determines if value-added services are to be provided to the mobile device 103.

The core servers in FIG. 2 are each arranged to provide specific functions, that are discussed in more detail below. Thus, there are shown connection servers 110-1 through 110-3, user signaling servers 112-1 through 112-3, and channel servers 114-1 through 114-3, it being understood that each of the servers 110, 112 and 114 can consist of a plurality (not necessarily three, as shown in FIG. 2) of distributed processors, and that the number of processors that cooperate to perform the functions of each of the servers can be increased, as desired. This allows the system to grow gracefully, with increased usage. To reduce costs, the processors may be realized using commercially available workstations running commercially available operating system software.

The interworking managers in FIG. 2 are also made up of a plurality of processors (three processors are illustrated for exemplary purposes in FIG. 2) and each of the interworking managers is arranged to provide interfaces to particular types of external networks, and therefore allow call processing in the core servers to be designed independently of the external signaling protocols, which is a significant feature of the present invention. The interworking managers generally interface with either elements in the signaling network 192 within telecommunications network 111, or with external interworking managers that in turn operate in association with other elements (such as BSC 105 or BTS 101) external to cMSC 100. This unique arrangement provides cMSC 100 with the flexibility to support new protocols as they are designed and standardized, without requiring modification of the core servers, simply by providing a new interworking manager that supports the new protocol. As networks evolve from the second to the third generation and new protocols thus emerge, the present invention can keep pace, and will not easily become obsolete.

Specifically, interworking manager 116-1 through 116-3 provides an IS634 interface (see IS-634 revision A, 2nd Ballot Version, October, 1997), which is the interface presently used to send signaling messages between an MSC and a BSC such as BSC 105 of FIG. 1. Interworking manager 118-1 through 118-3 provides an IS41 interface, which is the interface presently used to send common channel signaling (CCS) messages used for mobility management between an MSC and telecommunications network 111 of FIG. 1. For a description of a CCS system and the messages used therein, see ITU Recommendations Q.700–Q.795, "Specifications of Signaling System No. 7," 1989, and TIA/EIA IS-41 (Revision D): "Cellular Radio-Telecommunications Intersystem Operations," 1997. Interworking manager 120-1 through 120-3 provides an ISUP interface, which is another interface presently used to send CCS messages and the lower layer SS7 protocols (MTPL1-3) and the ISUP protocols used for call and connection control between an MSC and telecommunications network 111. It should be understood that, in a manner similar to that described above, the number of processors that cooperate to perform the functions of each of the interworking managers 116, 118 and 120 can be increased or decreased, as desired.

While only certain interfaces are shown in FIG. 2, the present invention contemplates incorporating other interworking managers as necessary. This may include the B-ISUP and the intelligent network application part (INAP) protocols.

FIG. 2 depicts the various servers 110, 112 and 114, and interworking managers 116, 118 and 120 being physically connected via a high-speed local area network 130. Nevertheless, it is within the scope of the present invention to have these elements execute on one or more processors that are co-located, and that are connected to each other via a backplane. All of the servers in FIG. 2 are functionally interconnected by communication middleware known as common object request broker architecture (CORBA), which allows the elements to operate in cooperation with one another. For this reason, as depicted schematically in FIG. 2, each of the core servers 110, 112 and 114, and each of the interworking managers 116, 118 and 120 includes a CORBA element, and a CORBA server 180 is shown as attached to LAN 130. Also, it may be helpful to think of the core servers and interworking managers in FIG. 2 as "processes" rather than physical objects. In accordance with the present invention, these processes can run on one or more physical (hardware) processors. In accordance with one aspect of the present invention, it is to be noted that the internal objects that constitute the core servers are accessible only by the interworking managers and not by elements outside of the mobile switching system. Thus, the interworking managers are the exclusive control interface between the core servers and the various elements in the telecommunications network external to the cMSC.

The three core servers 110, 112 and 114 discussed above each provide specific functionality. First, connection servers 110 determine a route between the BTS 101 serving the mobile device 103 and an outgoing circuit to the next hop switch at the edge of the telecommunications network 111. This includes choosing a frame selector (FS) 144 and vocoder (VC) 146 to perform frame selection and voice coding. FS 144 allows mobile devices 103 to transmit and receive from more that one base station simultaneously during a soft handoff, and determine which of several frames received from various base terminal stations 101 that contain the same user information should be forwarded to telecommunications network 111. VC 146 provides a conversion between the air interface coding and the pulse code modulation (PCM) used in telecommunications network 111. Typically, PCM data is transferred at 64,000 bits/second using a PSTN/ISDN protocol, between telecommunications network 111 and VC 146. Connection servers 110 interact with the channel servers 114, the base station controller 105 (through the IS634 interworking managers 116) and the telecommunications network 111 to reserve resources for this portion of the connection. The connection servers 110 maintain a connection software object for each active connection. (The role of software objects in the present invention is discussed in more detail below.) If desired, the routing performed by a connection server 110 can be based on the requested quality of service of the connection.

Second, user signaling servers 112 perform call/connection related functions, provide mobility management of second-generation visitor location registers 109 and provide access to intelligent network (IN) type services consistent with both second- and third-generation systems. Thus, each user signaling server 112 maintains call and connection state from the user's perspective. Mobility management functions include coordinating registration with the home network, managing paging, and assigning temporary routing numbers (called temporary local directory numbers, or TLDN), used by other network elements to route incoming calls to a mobile device 103. To provide access to IN services, each user signaling server 112 maintains a temporary copy of the user service profile that is obtained during registration procedures. It also checks service triggers during registration and call establishment procedures to determine if value-added services should be activated.

Third, channel servers 114 manage the resources of their respective channels. In the embodiment of the present invention illustrated in FIG. 2, channel servers 114 manage virtual channel identifier (VCI) space and bandwidth in an asynchronous transfer mode (ATM) switch 140, which performs switching of data signals in cMSC 100 and is coupled directly to telecommunications network 111 as well as to BTS 101. However, it is to be understood that packet technologies other than ATM can also be used. Channel servers 114 also manage functions specific to the air interface used to access MDs 103, and to the telecommunications networks used to carry user information. The channel servers 114 also control FS 144 and VC 146 during call establishment and release, as discussed in more detail below.

While both voice coding and frame selection are preferably supported by VC 146 and FS 144, respectively, other functional configurations are possible. For example, if the air interface does not allow soft handoffs, frame selection capability is not required. If the end-to-end connection does not require that the voice format be changed, then no voice coding is required. By the same token, different air interfaces may use different voice coding techniques. The particular arrangement used in the cMSC 100 of the present invention will be easily adapted by one skilled in the art to support these various voice coding formats.

Figure 3:
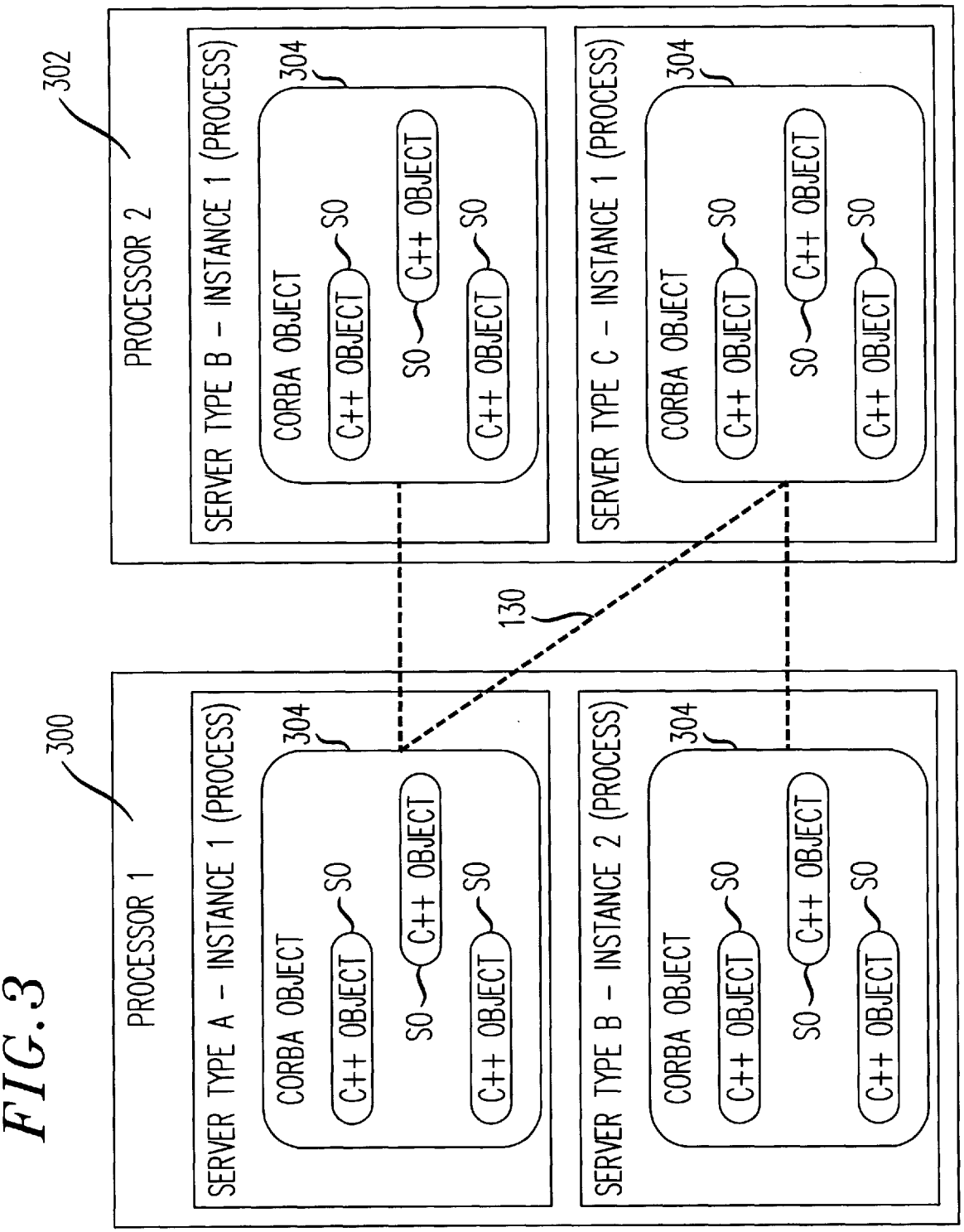
FIG. 3 is a conceptual depiction of the modular nature of the software used in implementing the present invention.

FIG. 3 schematically depicts a high level view of the software hierarchy in cMSC 100. To reduce the cost of the cMSC of the present invention, it is advantageously constructed using widely available commercial software and hardware platforms. This allows the system to be used with different platforms as technology evolves, and takes advantage of the increasing performance-to-price ratio of computing systems. In describing the present embodiment, it is assumed that the necessary software is written in C++ programming language and that the processors and operating software implementing the system will run C++ programming language.

As discussed above, the core servers 110, 112 and 114, and interworking managers 116, 118 and 120 of cMSC 100 of the present invention are implemented as processes that execute on standard computer processors. In FIG. 3, two processors 300 and 302 represent that concept, with different servers being implemented using these processors. The various servers (that is, the connection servers 110, the user signaling servers 112, the channel servers 114, and the interworking managers 116, 118 and 120) are represented conceptually in FIG. 3 as Server Types A, B and C. Note that a particular server (here Server B) may be implemented on more than one processor.

As depicted in FIG. 3, functions performed by the servers within the cMSC are implemented as CORBA objects 304. These CORBA objects are each made up of one or more software objects SO written in C++ language. The servers communicate with each other via network 130, by sending and receiving CORBA messages. Accordingly, the servers communicate using CORBA messages, which enables the present invention to use existing CORBA-based systems. However, the actual functions performed by the servers are controlled by the software objects SO. Accordingly, these functions can be changed to accommodate new developments as cellular networks evolve from generation to generation, without changing the entire system.

Figure 4:
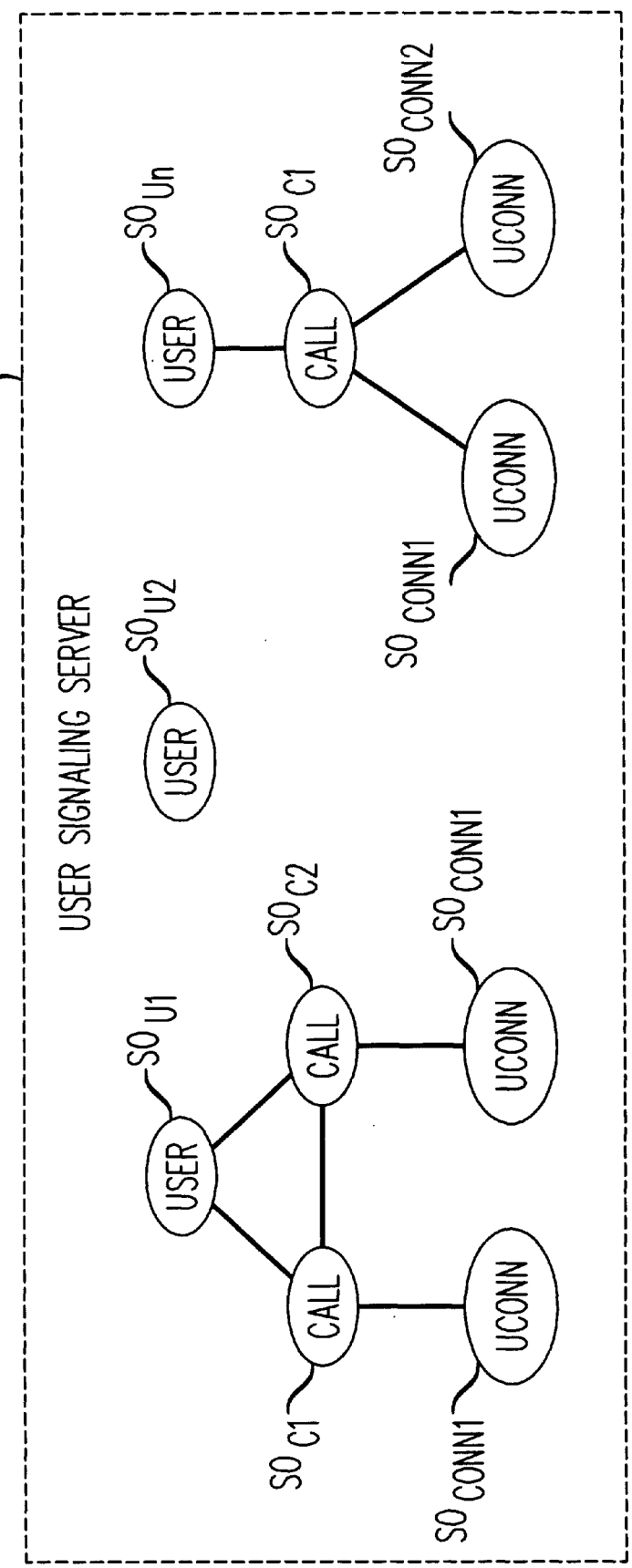
FIG. 4 illustrates an example of how the cluster mobile switching center of the present invention utilizes the software depicted in FIG. 3.

FIG. 4 illustrates how the present invention uses modular software objects in performing the functions of the system. This figure shows the operation of a user signaling server 112 as users register with the system. The user signaling server 112 establishes a user software object $SO_{Un}$ for each user as that user registers with the system. In FIG. 4, three separate user software objects, $SO_{U1}$, $SO_{U2}$ and $SO_{Un}$ are shown. When a user receives or requests a call, the user object initiates a call software object $SO_{Cn}$, which in turn initiates user-connection objects $SO_{CONNn}$ for each connection in the call. In FIG. 4, user software object $SO_{U1}$ has two call software objects $SO_{C1}$ and $SO_{C2}$, indicative, for example, of a conference call, user software object $SO_{Un}$ has a single call software object $SO_{C1}$, which is the normal situation, and user software object $SO_{U2}$ has no call software objects, since this user is involved in an incoming call. A call software object may have one or more user-connection objects; in FIG. 4, call software objects $SO_{C1}$ and $SO_{C2}$ each have a single user connection object $SO_{CONN1}$, while call software object $SO_{C1}$ in the right-hand portion of FIG. 4 has two user-connection objects $SO_{CONN1}$ and $SO_{CONN2}$. In this way the user signaling server can support multi-connection calls, which is a key requirement for third generation systems. In present second-generation systems, only simple connection services are supported. For incoming calls to a user, a shared temporary local directory number (TLDN) object is additionally used to allocate routing numbers.

It will be appreciated at this point that the present invention is scalable in both the functional and capacity dimensions. In FIG. 2, each of the interworking managers 116, 118 and 120, and the connection servers 110, the user signaling servers 112 and the channel servers 114 can be replicated as many times as is desired in a single cMSC. Thus, the capacity of the cMSC, that is, the number of calls it can handle, can be scaled up simply by adding more servers (either core servers or interworking managers or both).

As discussed above in connection with FIGS. 3 and 4, the communications middleware and software used in the present invention are modular; that is, each CORBA and software object performs a specific task or manages particular resources. Each object has a well defined interface through which other objects can access the functions performed by that object. As long as an object's interface with other objects is kept the same, the object's function may be modified to change its behavior or upgrade its functions without affecting other objects. This makes the system scalable in the functional dimension.

In cMSC 100 of the present invention, objects that perform closely related functions are grouped together into particular servers. In this fashion, the servers may be distributed across processors to more easily allow the system to be scalable in the capacity dimension. That is, by allowing different instances of the same software server to exist on different processors, it is possible to balance the processing load of the system. It is also easier to achieve higher reliability through networked redundancy. The modular software structure thus allows servers, and the components within the servers, to be reused to implement networks that support different applications and use different protocols.

Accordingly, the implications of using a modular software approach in accordance with the present invention are enormous. It provides significant advantages over alternate approaches to the problem of how to provide cellular telephone networks with the capability to handle increasing call traffic (capacity scaling) and increasing services (functional scaling).

For example, one alternative to using modular CORBA middleware and software objects is hand-coding the distributed application by custom writing the communications functions. The drawback to that approach is that the time to develop the system will be increased and any changes to message structures or the interface between servers may require a great deal of software redevelopment.

In contrast, advantages of the present invention's modular approach include: facilitating the management of communication between clients and servers, making it easier to deploy servers on different processors without clients being aware of the server locations, providing platform independence by making it possible to execute servers on various processors and operating systems, enabling reliable communication using the underlying TCP/IP protocols, and separating interfaces using CORBA interface definition language from implementation of the functions of the system using modular software objects.

Persons skilled in the art will appreciate that various changes and modification can be made to the present invention without departing from its spirit or limiting its scope. Accordingly the invention is to be limited only in accordance with the following claims.

What is claimed is:

1. A wireless mobile switching system arrangement for controlling calls to and from a plurality of mobile telephone devices, said arrangement including
   a plurality of interconnected processors executing modular software as a set of distributed processes; and
   communications middleware for controlling said distributed processes,
   said distributed processes being arranged to emulate and perform the functions of:
      (a) a plurality of interworking managers that act as gateways between said mobile switching system and a telecommunications network, and
      (b) a plurality of core servers that define software objects in order to perform call processing functions,
      wherein said core servers are functionally segmented to individually perform separate functions, including
         (i) user signaling,
         (ii) call connection and
         (iii) channel control.

2. The invention defined in claim 1 wherein functionality within each of said core servers is implemented as a collection of C++ objects.

3. The invention defined in claim 2 wherein said plurality of interconnected distributed processors is interconnected via a high speed LAN.

4. The invention defined in claim 2 wherein said plurality of interconnected distributed processors is interconnected via a backplane.

5. The invention defined in claim 1 wherein said telecommunications network is the public switched telephone network (PSTN), an ISDN or B-ISDN network, or the Internet.

6. The invention defined in claim 1 wherein the internal objects that constitute said core servers are accessible only by said interworking managers and not by elements outside said mobile switching system.

7. Apparatus for processing wireless telephone calls to and from a plurality of mobile telephones, said apparatus comprising
   at least two interconnected distributed processors operating under software control for cooperatively providing telecommunications functionality, said distributed processors including
      (a) means for providing interworking managers that interface between said apparatus and external communications networks, and
      (b) means for providing a plurality of core servers each arranged to perform specific call processing functions, including user signaling call connection and channel control,
   wherein said core servers are constituted by objects that are accessible only by said interworking managers and not by elements outside of said apparatus.

8. The invention defined in claim 7 wherein said distributed processors communicate with each other using CORBA middleware.

* * * * *